Aug. 3, 1937.　　　　　C. F. GREINER　　　　　2,088,854
TRANSPORTING MEANS FOR ROAD ROLLERS AND THE LIKE
Filed Oct. 17, 1936　　　2 Sheets-Sheet 1
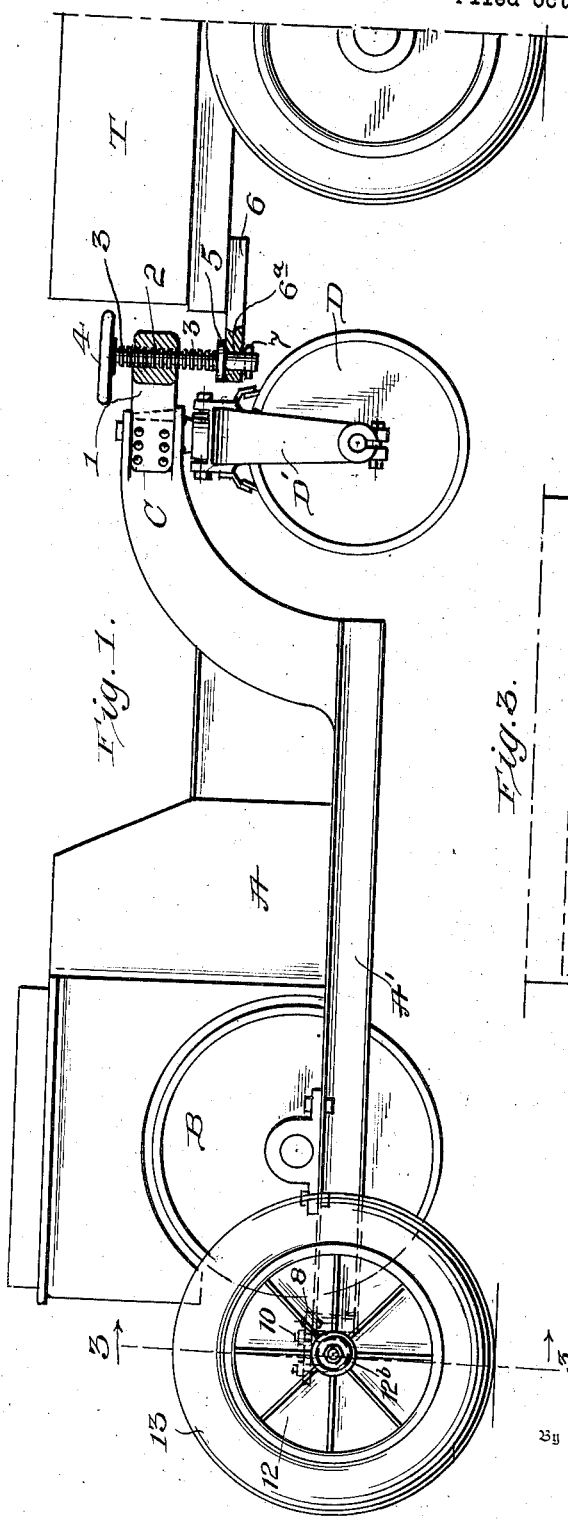
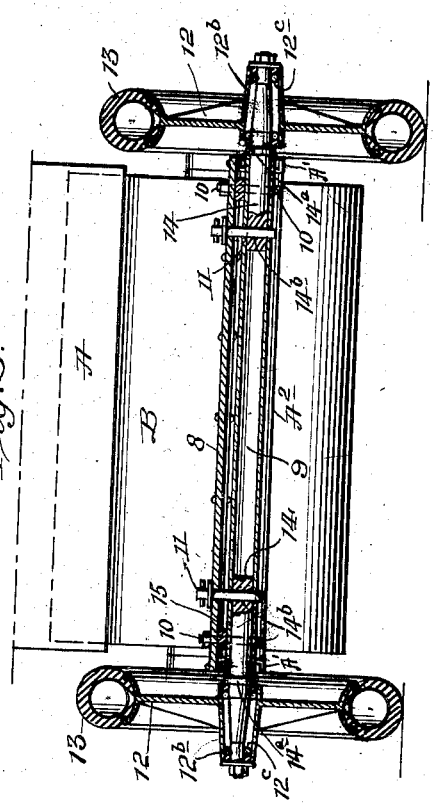
Inventor
Carl F. Greiner
By Alexander Dodd
Attorney

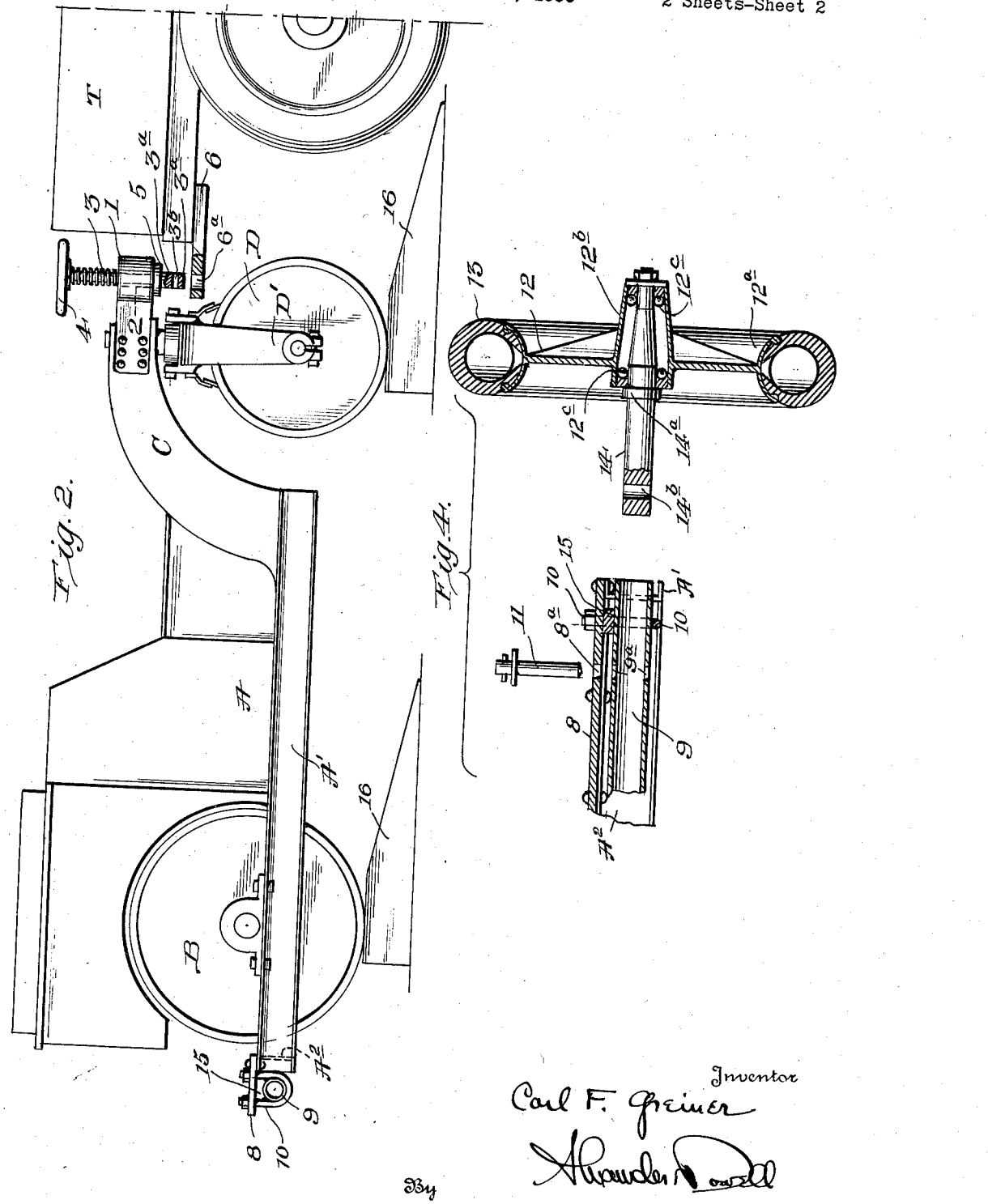

Patented Aug. 3, 1937

2,088,854

UNITED STATES PATENT OFFICE 2,088,854

TRANSPORTING MEANS FOR ROAD ROLLERS AND THE LIKE

Carl F. Greiner, Springfield, Ohio, assignor to The Buffalo-Springfield Roller Co., Springfield, Ohio, a corporation of Ohio Application October 17, 1936, Serial No. 106,217

4 Claims. (Cl. 280—80)

This invention is a novel transporting means which may be applied quickly and readily to road rollers and/or like heavy slow-moving machines or vehicles to adapt same for fast transportation from one job to another. For certain classes of road construction, such as for paving filling stations, private roadways and paths, and for patch work on city and country streets and roads, it is desirable to utilize a small road roller which can be easily and quickly transported to and from the work. It is also very desirable that when the roller is at work, it will perform as a standard road roller.

The principal object of my invention is to provide readily attachable transporting means including pneumatic or other cushion wheels which may be attached to the rear corners of the frame of the road roller or the like to maintain the ordinary rear ground roll of the road roller raised above the ground; and also to provide readily connectible draft and suspension means at the front end of the road roller or the like, whereby the front end of same may be suspended from the rear end of the chassis of a towing truck with the front or steering roll of the road roller raised above the ground, in order that the road roller or like vehicle or machine may be drawn quickly and at relatively high speeds from one job on a road to another.

A further object of the invention is to provide the rear end of the vehicle frame with a permanently attached tubular member into which member the stub shafts of pneumatic or other cushioned wheels may be inserted and locked when it is desired to transport the roller, the tubular member being so arranged that when the road roller is at work on the job, the stub shafts are readily removed, leaving no parts extending beyond the roller frame, thus allowing the roller to work close to curbs, trees, and other fixed objects; the said cushioned wheels cooperating with novel suspending and drawing means at the front end of the roller frame which may be quickly engaged with towing devices such as draw bars at the rear end of the towing truck, to support the front end of the frame and permit the road roller thus equipped with my transporting means to trail the towing truck safely at relatively high speeds.

I will explain the invention with reference to the accompanying drawings which illustrate one practical embodiment thereof to enable others to adopt and use the same; and will summarize in the claims the novel features of construction and novel combinations of parts for which protection is desired.

In said drawings:—

Fig. 1 is a side elevation of a conventional road roller of the tandem type showing my novel readily attachable transporting wheels supporting the rear end of the road roller frame so that the rear ground roll thereof is maintained above the road surface; also showing the front end of the road roller frame engaged with the suspending and towing means of the towing truck, in which position the front steering roll is likewise maintained raised above the road surface.

Fig. 2 is a view similar to Fig. 1 showing the road roller supported upon the wedge blocks used for elevating the road roller into position for attachment of the rear transporting wheels, and for connection of the front end of the roller frame to the draw bar of the towing truck.

Fig. 3 is a transverse section on the line 3—3, Fig. 1.

Fig. 4 is a section similar to Fig. 3 but showing the stub axle of the transporting wheel removed from the tubular member, which latter is permanently mounted on the road roller frame.

As shown, the road roller is of conventional tandem type, having a frame comprising side members A reinforced at their lower ends by channel irons A', said side members carrying the usual motor or engine (not shown). The rear ends of channel irons A' are connected together by a channel iron A². A driving roll B is journaled in the side members adjacent their rear ends, the front ends of the side members converging and terminating in a goose-neck portion C overlying the front steering roll D. The yoke D' of the front steering roll is mounted in trunnions in the front end of the goose-neck C in the usual manner. The road roller thus far described is of conventional tandem type, the details thereof forming no part of my present invention.

Secured to the front end of goose-neck C is a casting 1 disposed on the longitudinal axis of the road roller frame, said casting having a tapped bore 2 receiving a coupling pin 3 threaded throughout the major portion of its length to engage the bore 2, pin 3 carrying on its upper end a hand wheel 4 whereby same may be manually rotated to raise and lower same. Pin 3 has a collar 5 thereon spaced from its lower end, and the portion of the pin below the collar is cylindrical as at 3a and adapted to snugly engage a hole 6a of smaller diameter than the collar 5 in a draw bar 6 secured to the rear end of the chassis of a towing truck T on the center line thereof. Draw bar 6 is disposed at such height with respect to the casting 1 that when the cylindrical portion 3a of the pin is engaged in the hole 6a, as shown in Fig. 1, the front end of the road roller frame will be supported by and suspended from the towing truck, and the steering roll D of the road roller will be maintained above the road surface. The cylindrical portion 3a of pin 3, being of greater length than the thickness of draw bar 6, extends below same when the pin is engaged with hole 6a, and the extending portion is provided with a transverse hole 3b to receive a bolt 7 which prevents withdrawal of pin 3 from the hole 6a when the parts are assembled as in Fig. 1.

As the rear end of the road roller frame is a plate 8 extending between the ends of the channel irons A' and permanently secured by rivets or the like to the top leg of channel iron A², said plate as shown projecting rearwardly beyond the ends of the channel iron. Beneath the projecting portion of plate 8 is a tube 9, permanently secured to the underside of plate 8 by means of U-bolts 10 passing under tube 9, the legs thereof passing upwardly through perforations in plate 8 and provided with nuts on the upper ends thereof. Suitable filler blocks 15 are disposed between tube 9 and plate 8 at the U-bolts whereby the tube is securely and fixedly clamped in position to become a permanent part of the frame. Tube 9 is of such length that no portion thereof extends beyond the limits of side frames A'. Extending through plate 8 and through tube 9, adjacent each end thereof, are holes 8a and 9a respectively (Fig. 4) which are aligned so as to receive pins 11 for the purpose hereinafter described.

The transporting wheels 12 are provided with rims 12a receiving pneumatic or other cushion tires 13; and the hubs 12b of the wheels are preferably mounted by means of ball or roller bearings 12c on stub shafts 14 adapted to snugly fit the ends of tube 9, said stub shafts being provided with collars 14a (Fig. 4) adjacent the hubs and with transverse bores 14b adapted when the stub shafts are inserted in tube 9 as shown in Fig. 3 to align with the holes 8a, 9a respectively in plate 8 and tube 9, whereby the pins 11 may be dropped therethrough to securely lock the stub shafts in the tube. When the pins 11 are removed, however, the stub shafts 14 may be readily withdrawn from the tube, as shown in Fig. 4.

By the above construction, when it is desired to transport the normal slow-moving road roller to a new location, wedge blocks 16—16 (Fig. 2) are laid on the ground adjacent the peripheries of the front and rear rolls D and B, and the road roller is run by its own power onto the tops of the wedge blocks as shown in Fig. 2. In this position the road roller will be maintained sufficiently raised above the ground surface that the stub shafts 14 of transporting wheels 12 may be inserted in the ends of tube 9, and the lower end of towing pin 3 will pass over the top of draw bar 6 of the towing truck as shown in Fig. 2. The stub axles 14, equipped with cushion tires, are then inserted and locked by pins 11 in each end of tube 9, and the towing truck T is backed up into proper position so that the threaded pin 3 can be screwed down by hand wheel 4 into the hole 6a in the draw bar 6, and locked therein by means of bolt 7. The towing truck can now be driven away safely and at relatively high speed with the road roller trailing the front end of the road roller frame, being suspended by the towing truck and the rear end riding on the cushioned wheels 12.

When the towing truck T arrives at the desired destination, wedge blocks 16 are again placed in proper position adjacent the rolls B and D of the road roller, and the road roller then pushed up the incline by the truck onto the flat upper portion of said blocks. The threaded coupling pin 3 is then screwed upwardly out of engagement with draw bar 6, and the cushion-tired wheels 12 removed from tube 9 with their stub axles 14. The road roller is run down the wedge blocks 16 under its own power and on to its work.

When the transporting wheels 12 are removed, there will be no projecting parts or portions extending beyond the sides or end of the road roller frame, and hence the road roller may be operated in close proximity to curbs, trees and other fixed obstructions.

The above construction is simple, inexpensive, and easy to operate, and dispenses with the necessity of providing the usual low flat truck upon which the road roller must be run for transportation; thereby dispensing with the cost of such truck incident to the use thereof.

I claim:

1. In combination with a vehicle having a wheel supported frame, a member connected with the front end of the frame and disposed on the longitudinal axis thereof means associated with the member adapted to engage a towing truck and suspend the said end of the frame thereon; bearing members carried by the other end of the frame at opposite sides thereof; and ground wheels removably journaled in the said bearing members and supporting said other end of the frame; said members together providing a three-point suspension for the vehicle whereby the wheels of the vehicle will be maintained above the road surface during transportation.

2. In means as set forth in claim 1, the bearing members terminating within the area of the frame.

3. In means as set forth in claim 1, said suspending means comprising a casting secured to the frame and having a tapped bore; a manually rotatable pin having a threaded portion engaging the tapped bore, and adapted to engage a depression in a draw bar on the end of the towing truck; and means independent of the pin for elevating the frame whereby the pin and depression may be aligned.

4. In means as set forth in claim 1, said bearings comprising a tubular member secured to the rear end of the frame and having its ends terminating within the limits of area of the frame; and said ground wheels having stub-shafts adapted to enter the tubular member; and pins transfixing the shafts and tube for locking the shafts in the tubular member.

CARL F. GREINER.